United States Patent
Kobayashi

(10) Patent No.: US 6,535,587 B1
(45) Date of Patent: Mar. 18, 2003

(54) INTEGRATED TRANSMITTER, LAN COMMUNICATION EQUIPMENT, TELEPHONE COMMUNICATION APPARATUS AND COMMUNICATION METHOD USING INTEGRATED TRANSMITTER

(75) Inventor: Yoshikazu Kobayashi, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 0 days.

(21) Appl. No.: 09/576,494

(22) Filed: May 23, 2000

(30) Foreign Application Priority Data

May 24, 1999 (JP) .......................................... 10/143357

(51) Int. Cl.⁷ ............................................. H04M 11/00
(52) U.S. Cl. .................................. 379/90.01; 379/93.08
(58) Field of Search .......................... 379/90.01, 93.05, 379/93.06, 93.07, 93.08, 93.09, 399.01, 399.02; 370/480, 493, 498, 527, 529

(56) References Cited

U.S. PATENT DOCUMENTS 5,841,841 A * 11/1998 Dodds et al. ............ 379/90.01
5,896,389 A    4/1999 Kobayashi et al. ......... 370/527
5,896,443 A * 4/1999 Dichter ..................... 379/90.01

* cited by examiner

Primary Examiner—Stella Woo
(74) Attorney, Agent, or Firm—Sughrue Mion, PLLC

(57) ABSTRACT

Disclosed is an integrated transmitter which is capable of a telephone and a LAN. The integrated transmitter comprises a first signal distribution circuit for distributing a LAN signal into first and second signals, each of which has an absolute value equal to each other; a second signal distribution circuit for distributing a telephone signal into third and fourth signals, each of which has an absolute value equal to each other; a coaxial cable for transmitting individually the first and third signals on one of two lines thereof and for transmitting the second and fourth signals on the other of the two lines thereof; a subtraction circuit for subtracting the second and fourth signals from the first and third signals to detect the LAN signal; and an adder circuit for adding the second and fourth signals to the first and third signals to detect the telephone signal.

18 Claims, 12 Drawing Sheets

INTEGRATED TRANSMITTER, LAN COMMUNICATION EQUIPMENT, TELEPHONE COMMUNICATION APPARATUS AND COMMUNICATION METHOD USING INTEGRATED TRANSMITTER

BACKGROUND OF THE INVENTION

1. Field of the Invention

The present invention relates to a technology for integrating channels of a local area network (hereinafter referred to as LAN) communication apparatus with channels of a telephone apparatus such as terminal devices and exchanges, more particularly to an integrated transmitter for the LAN communication equipment with the telephone apparatus, a telephone apparatus and a LAN communication equipment which are connected to a coaxial cable or a twisted pair line of the LAN and transmit phone signals and LAN data simultaneously, and a communication method for transmitting the phone signals and the LAN signals.

2. Description of the Prior Art

Computer telephony and IP telephony for achieving a high efficiency in business by simultaneous use of the LAN and the telephones has been put into a practical use with a development of the Internet. In the communication telephony and the IP telephony, actual communication contents themselves must be integrated, and software for integrating them must be installed in computer communication terminal devices.

On the other hand, there have been client's needs to integrate the LAN with the telephones while using a conventional communication system still within an enclosure such as a building. Offering of goods to meet their needs has been desired.

In U.S. Pat. No. 5,896,389, an integrated transmitter in which LAN and telephones are integrated by a common transmission line is disclosed. To be more specific, the following technology is disclosed. A transducer is connected to each terminal of two pairs of twin lines which connect the LAN and the telephones. LAN signals are sent out from both terminals of the transducer and telephone signals are sent out in-phase using a center tap of the transducer. Thus, the pair of twin lines is used for simultaneously transmitting the telephone signals and the LAN signals, thus realizing the integration of the LAN and the telephone by a common transmission line.

According to the above mentioned integrated transmitter, signal lines for the LAN and telephone lines are integrated to one transmission line, that is, a pair of twin lines, so that the number of lines can be reduced. In addition, the technology disclosed in the integrated transmitter has a merit that the conventional LAN communication equipment and telephone communication apparatus are still used and the LAN signals and the telephone signals can be simultaneously transmitted. Therefore, this technology is capable of constructing an economic system.

However, in the technology disclosed in the U.S. Pat. No. 5,896,389, telephone signals are supplied to the center tap of the transducer, and the telephone signals are fetched out from the center tap. Thus, the telephone signals are transmitted as identical in-phase signals. Accordingly, a precision of the center tap of the transducer is required, and a more expensive transducer compared to a transducer with a center tap on the market is needed. At least two pairs of two lines are necessary.

Furthermore, because of a transducer superposing/separating circuit for superposing the telephone signal supplied to the center tap of the transducer on the LAN signal and for separating the telephone signal and the LAN signal from the transducer, there is a limitation to a high speed processing.

SUMMARY OF THE INVENTION

A first object of the present invention is to provide an integrated transmitter and a communication method for integrating LAN and telephones without supplying a telephone signal to a center tap of a transducer, that is, without constructing a transducer superposing/separating circuit.

A second object of the present invention is to provide an integrated transmitter and a communication method which are capable of using an inexpensive transducer on the market, which requires no precision of its center tap.

A third object of the present invention is to provide a telephone apparatus and a LAN communication equipment which are connected either to the coaxial cable or to the twisted pair line of the LAN and capable of integrally transmitting the telephone signal and the LAN data, can be provided.

An integrated transmitter of the present invention comprises a first signal distribution circuit for distributing a LAN signal into first and second signals, each of which has an absolute value equal to each other; a second signal distribution circuit for distributing a telephone signal into third and fourth signals, each of which has an absolute value equal to each other; a transmission line having two lines which transmit individually the first and third signals and the second and fourth signals; and a receiving circuit for detecting a receiving circuit for detecting at least one of the LAN signal and the telephone signal by adding one of the signals to the other signal, transmitted on each of the two lines, or subtracting one of the signals from the other signal, transmitted on each of the two lines.

An integrated transmitter of the present invention comprises a transmission circuit for distributing a LAN signal into first and second signals, each of which has an absolute value equal to each other, for distributing a telephone signal into third and fourth signals, each of which has an absolute value equal to each other, and for sending out individually the first and third signals and the second and fourth signals onto two lines of a transmission line; and a receiving circuit for detecting a receiving circuit for detecting at least one of the LAN signal and the telephone signal by adding one of the signals to the other signal, transmitted on each of the two lines, or subtracting one of the signals from the other signal, transmitted on each of the two lines.

A communication method of a telephone signal and a LAN signal of the present invention comprises the steps of: distributing a LAN signal into first and second signals, each of which has an absolute value equal to each other; distributing a telephone signal into third and fourth signals, each of which has an absolute value equal to each other; sending out individually the first and third signals and the second and fourth signals onto two lines of one transmission line; and detecting a receiving circuit for detecting at least one of the LAN signal and the telephone signal by adding one of the signals to the other signal, transmitted on each of the two lines, or subtracting one of the signals from the other signal, transmitted on each of the two lines.

According to the integrated transmitter and the communication method, since the telephone signal is superposed on the LAN signal on the line used in the conventional LAN, a telephone communication can be integrated into a communication using a line of LAN. Furthermore, the LAN signal and the telephone signal are integrated with each other without supplying the telephone signal to a center tap of a transducer, that is, without constructing a transducer superposing/separating circuit, and the telephone signal can be superposed on the LAN signal on the line of LAN. Thus, a communication speed is made to be high, and use of a telephone line is made to be unnecessary.

A LAN communication equipment of the present invention is the one which is connected to an integrated transmitter having a transmission circuit for distributing a LAN signal into first and second signals, each of which has an absolute value equal to each other, for distributing a telephone signal into third and fourth signals, each of which has an absolute value equal to each other, and for sending out individually the first and third signals and the second and fourth signals onto two lines of a transmission line. The LAN communication equipment has a feature in that a receiving circuit for adding or subtracting the signals individually transmitted on the two lines of the transmission line to detect either the LAN signal or the telephone signal, the data processing circuit 31 for receiving the LAN signal detected by the receiving circuit and for performing the data processing for the detected LAN signal, and an interface (telephone interface 41) for supplying the telephone signal detected by the receiving circuit to the outside.

Another LAN communication equipment of the present invention is the one which is connected to an integrated transmitter having a transmission circuit for distributing a LAN signal into first and second signals, each of which has an absolute value equal to each other, for distributing a telephone signal into third and fourth signals, each of which has an absolute value equal to each other, and for sending out individually the first and third signals and the second and fourth signals onto two lines of a transmission line, wherein a receiving circuit for detecting the LAN signal by subtracting the second and fourth signals from the first and third signals and for detecting the telephone signal by adding the second and fourth signals to the first and third signals, the second and fourth signals being transmitted one of the two lines of the transmission line and the first and third signals being transmitted onto the other of the two lines of the transmission line; a processing circuit for receiving the LAN signal detected by the receiving circuit to execute a data processing for the LAN signal; and a telephone circuit for executing a telephone communication by the telephone signal detected by the receiving circuit.

With such constitution, it is possible to execute the telephone communication while executing simultaneously the communication for the LAN signal by the LAN communication equipment.

A telephone communication apparatus of the present invention is connected to an integrated transmitter having a transmission circuit for distributing a LAN signal into first and second signals, each of which has an absolute value equal to each other, for distributing a telephone signal into third and fourth signals, each of which has an absolute value equal to each other, and for sending out individually the first and third signals and the second and fourth signals onto two lines of a transmission line. The telephone communication apparatus of the present invention has a feature in that a receiving circuit for detecting the LAN signal by subtracting the second and fourth signals from the first and third signals and for detecting the telephone signal by adding the second and fourth signals to the first and third signals, the second and fourth signals being transmitted one of the two lines of the transmission line and the first and third signals being transmitted onto the other of the two lines of the transmission line; a telephone circuit for receiving the telephone signal detected by the receiving circuit to execute a telephone communication; and an interface for supplying the LAN signal detected by the receiving circuit to the outside.

With such constitution, the telephone communication apparatus is provided, which can execute the telephone communication by connecting the telephone set to the transmission line of the LAN, and further can receive and send the LAN signal.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Embodiments of the present invention will be described in detail with reference to the accompanying drawings below.

Figure 1:
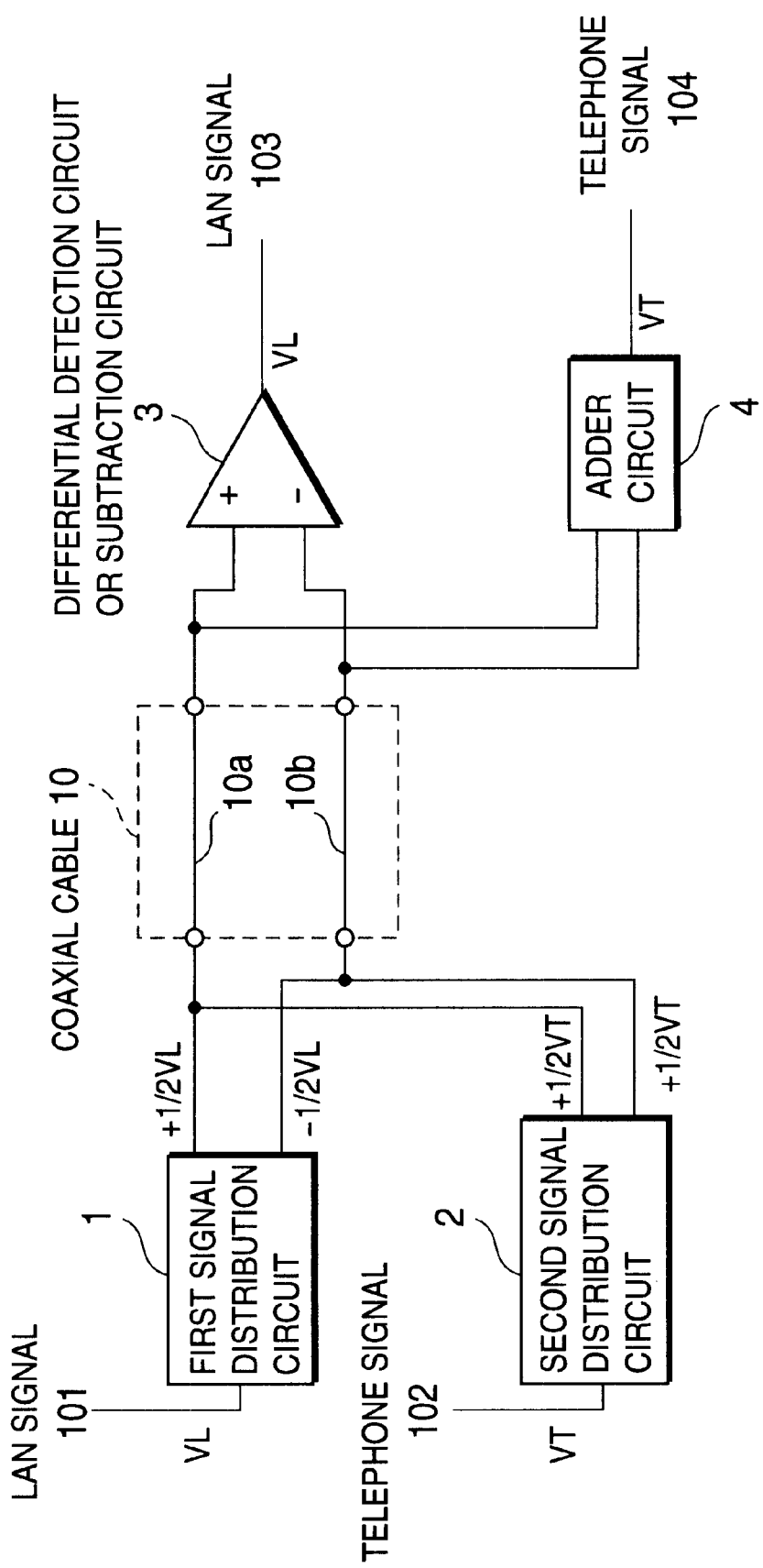
FIG. 1 is a block diagram showing a first embodiment of an integrated transmitter of the present invention.

FIG. 1 is a block diagram showing a first embodiment of an integrated transmitter of the present invention, which shows an example in which a LAN and a telephone are integrated with each other.

In FIG. 1, a first signal distribution circuit 1 and a second signal distribution circuit 2 are disposed on a transmission side, and a subtraction circuit 3 and an adder circuit 4 are disposed on a receiving side.

The first signal distribution circuit 1 and the second signal distribution circuit 2 may be united into one as a transmission circuit, or may be separated from each other. Moreover, the subtraction circuit 3 and the adder circuit 4 may be united into one as a receiving circuit, or may be separated from each other.

On the transmission side, a LAN signal 101 having a voltage value VL supplied from a LAN communication equipment (not shown) such as a computer, which is connected to a LAN network, is supplied to the first signal distribution circuit 1. A telephone signal 102 having a voltage value VT from a telephone communication apparatus (not shown) is supplied to the second signal distribution circuit 2. Here, the telephone signal 102 should be a telephone signal from, for example, a digital telephone apparatus, which hardly contains DC components. Furthermore, the voltage values VL and VT are not always constant, but normally variable.

The first signal distribution circuit 1 distributes the LAN signal 101 into two signals, each of which has a half voltage value that of the LAN signal 101. The first signal distribution circuit 1 outputs a non-inverted distribution signal and an inverted distribution signal as first and second signals. To be more specific, the LAN signal 101 having the voltage value VL is distributed into LAN signals. One LAN signal has a voltage value of ½VL, and the other LAN signal has a voltage value of −½VL.

On the other hand, the second signal distribution circuit 2 distributes the telephone signal 102 into two signals, each of which has a half voltage value that of the telephone signal 102. The second signal distribution circuit 2 outputs two non-inverted distribution signals as third and fourth signals. To be more specific, the telephone signal 102 having the voltage value VT is distributed into two LAN signals, each of which has a voltage value of ½VT.

However, it is satisfactory that the absolute values of the non-inverted and inverted signals from the first signal distribution circuit 1 are equal to each other and the absolute values of the two non-inverted signals from the second distribution circuit 2 are equal to each other, and it is not required for the first and second signal distribution circuits 1 and 2 to distribute the LAN signal and the telephone signal into the first to fourth signals so that the first to fourth signals have a half voltage value those of the LAN signal 101 and the telephone signal 102 as shown in FIG. 1. For example, the first and second signal distribution circuits 1 and 2 may not multiply the LAN signal 101 and the telephone signal 102, or may distribute and amplify the LAN signal 101 and the telephone signal 102 to be double or treble. The voltage value after the distribution is not limited to ½. Although in the following descriptions for all embodiments, the LAN signal and the telephone signal 102 are distributed so that the voltage values of the distributed signals are half those of the LAN signal 101 and the telephone signal 102, the voltage value is not limited to this.

Figure 2:
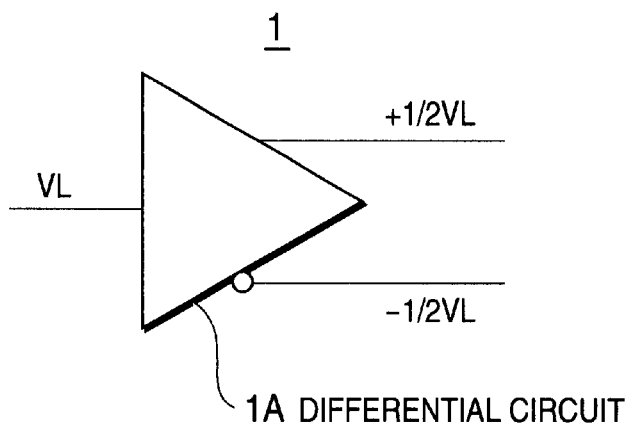
FIG. 2 is a circuit diagram showing an example of a first signal distribution circuit shown in FIG. 1.
Figure 3:
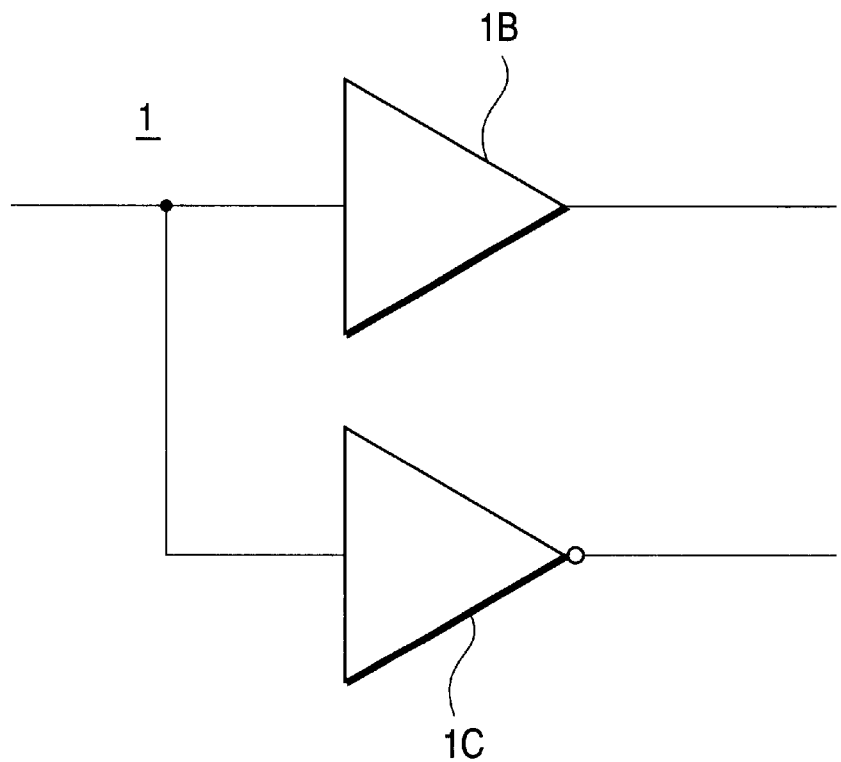
FIG. 3 is a circuit diagram showing another example of the first signal distribution circuit shown in FIG. 1.
Figure 4:
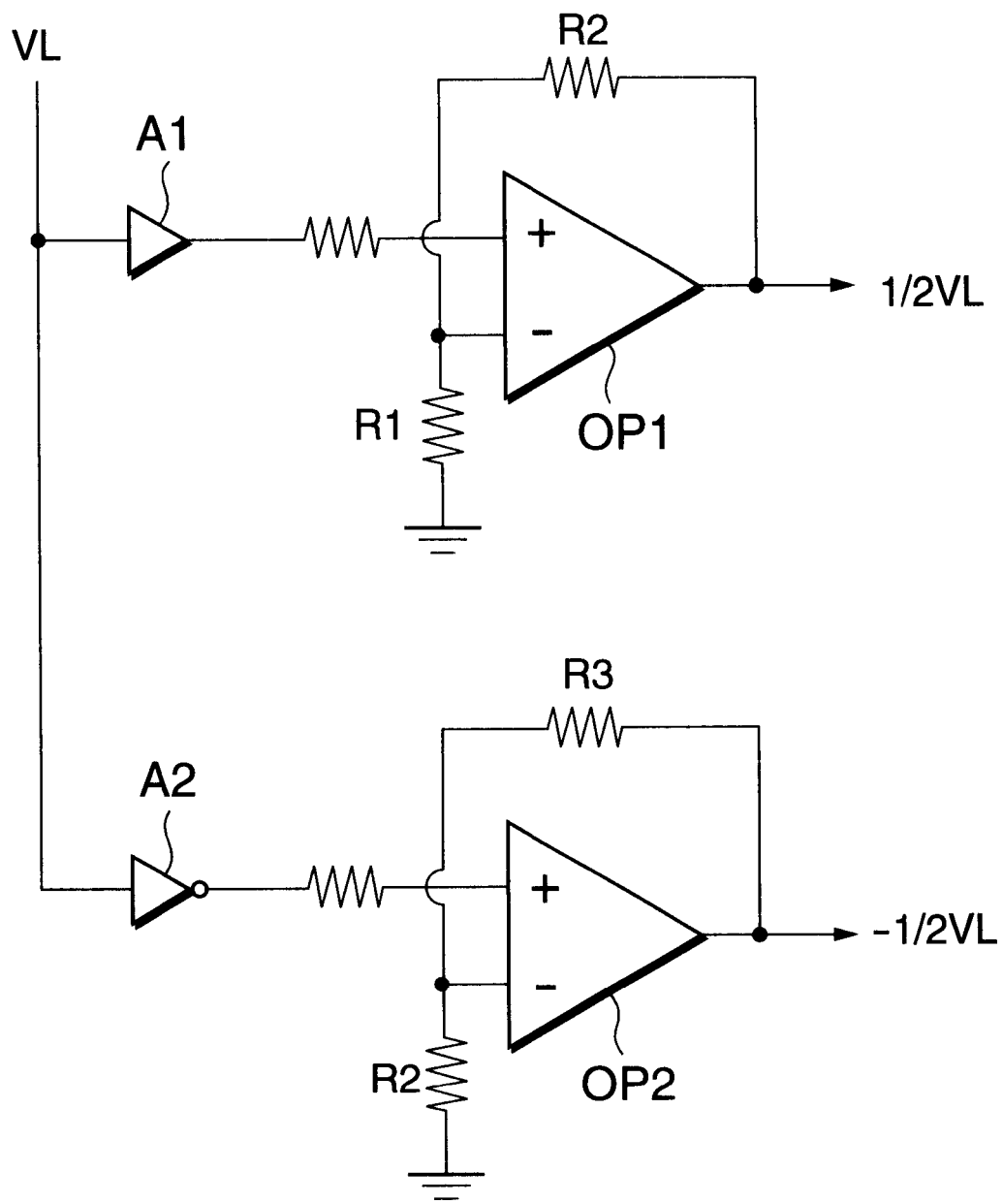
FIG. 4 is a circuit diagram showing still another example of the first signal distribution circuit of the first signal distribution circuit shown in FIG. 1.

FIGS. 2, 3 and 4 are circuit diagrams showing examples of the first signal distribution circuit 1. FIG. 2 shows an example in which the first signal distribution circuit 1 is constituted by a differential circuit 1A. An inverted output and a non-inverted output of the differential circuit 1A are the distribution signals. FIG. 3 shows an example in which the first signal distribution circuit 1 is constituted by a non-inverting amplifying circuit 1B and an inverting amplifying circuit 1C.

The first signal distribution circuit 1 of FIG. 4 is constituted by using a non-inverting circuit A1, an inverting circuit A2, and operational amplifiers OP1 and OP2. In FIG. 4, when a resistance value R1 is equal to a resistance value R2, a voltage value of (½)·VL is output from the operational amplifier OP1. When a resistance value R3 is equal to a resistance value R4, a voltage value of (−½)·VL is output from the operational amplifier OP2.

The first signal distribution circuit 1 is not limited to the circuits shown in FIGS. 2, 3 and 4. Any circuit may be adopted as the first signal distribution circuit 1, as long as the adopted circuits distribute the LAN signal and the telephone signal so that the absolute values of the signals obtained after distributing the LAN signal are equal to each other and the absolute values of the signals obtained after distributing the telephone signal are equal to each other. For example, in the case where the LAN signal 101 is distributed, the voltage value VL of the LAN signal 101 is distributed into two signals having a voltage value of ½ VL, and then one of the two signals may be inverted so as to have a voltage value of (−½)·VL. If a synchronization of the two distributed signals is broken by a delay owing to an inversion of one of the two distributed signals, a correction may be performed in such manner that the other signal not to be inverted is delayed so as to be synchronized with the inverted signal.

The second signal distribution circuit 2 can be constituted similarly to the first signal distribution circuit 1 shown in FIGS. 2, 3 and 4. Note that the second signal distribution circuit 2 is different from the first signal distribution circuit 1 in that the second signal distribution circuit 2 does not invert one of the two distributed signals.

Each of the signals distributed by the first signal distribution circuits 1 is integrated to the corresponding signal distributed by the second signal distribution circuit 2 and transmitted by the coaxial cable 10. In FIG. 1, the voltages of the outputs from the first and second distribution circuits 1 and 2 added to each other because of the integration, and the addition may be performed by using an adder circuit.

The coaxial cable 10 is a coaxial cable in conformity with LAN standards, and a cable TVLAN of, for example, 10BASE-5 and 10BASE-2 of IEEE802.3 and IEEE802.14 is used.

The coaxial cable 10 has a central conductor 10a and an outer conductor 10b surrounding the periphery of the central conductor 10a, and the LAN signal having the voltage value of (½)·VL (hereinafter referred to as ½VL) and the telephone signal having the voltage value of (½)·VT (hereinafter referred to as ½VT) are supplied to the central conductor 10a and transmitted thereon. The LAN signal having the voltage value of −½VL and the telephone signal having the voltage value of ½VT are supplied to the outer conductor 10b and transmitted thereon.

On the receiving side, a subtraction circuit (or differential detection circuit) 3 is connected to the lines of the central conductor 10a and the outer conductor 10b of the coaxial cable 10, and the LAN signal 103 is outputted from the subtraction circuit 3. An adder circuit 4 is connected to the lines of the central conductor 10a and the outer conductor 10b of the coaxial cable 10, and the telephone signal 104 is outputted from the adder circuit 4. In other words, with respect to the LAN signal and the telephone signal which are superposed and transmitted by the coaxial cable 10, the LAN signal is detected by the subtraction circuit 3 and the telephone signal is detected by the adder circuit 4.

In the subtraction circuit 3, the operation in compliance with the following formula (1) is carried out.

$$(\tfrac{1}{2}VL+\tfrac{1}{2}VT)-(-\tfrac{1}{2}VL+\tfrac{1}{2}VT) \tag{1}$$

As a result of the operation, the voltage value of the LAN signal 103 from the subtraction circuit 3 is VL, and thus the original LAN signal is regenerated.

The subtraction circuit 3 may be a circuit for inverting a signal from the outer conductor 10b, which has a voltage value of (−½VL+½VT), and for adding it to (½VL+½VT), in addition to the differential detection circuit and a digital computation.

In the adder circuit 4, the operation in compliance with the following formula (2) is carried out.

$$(½VL+½VT)+(-½VL+½VT) \qquad (2)$$

As a result of the operation, the voltage value of the telephone signal 104 from the adder circuit 4 is VT, and the original telephone signal is regenerated.

According to the embodiment shown in FIG. 1, since the integrated transmitter for integrating the LAN and the telephone with each other is provided without supplying the telephone signal to the center tap of the transducer, that is, without constituting the transducer superposing/separating circuit, a high speed processing is enabled. The first and second signal distribution circuits 1 and 2, the subtraction circuit 3 and the adder circuit 4 can be easily fabricated in the form of integrated circuits, thus achieving a compact size of the apparatus.

Figure 5:
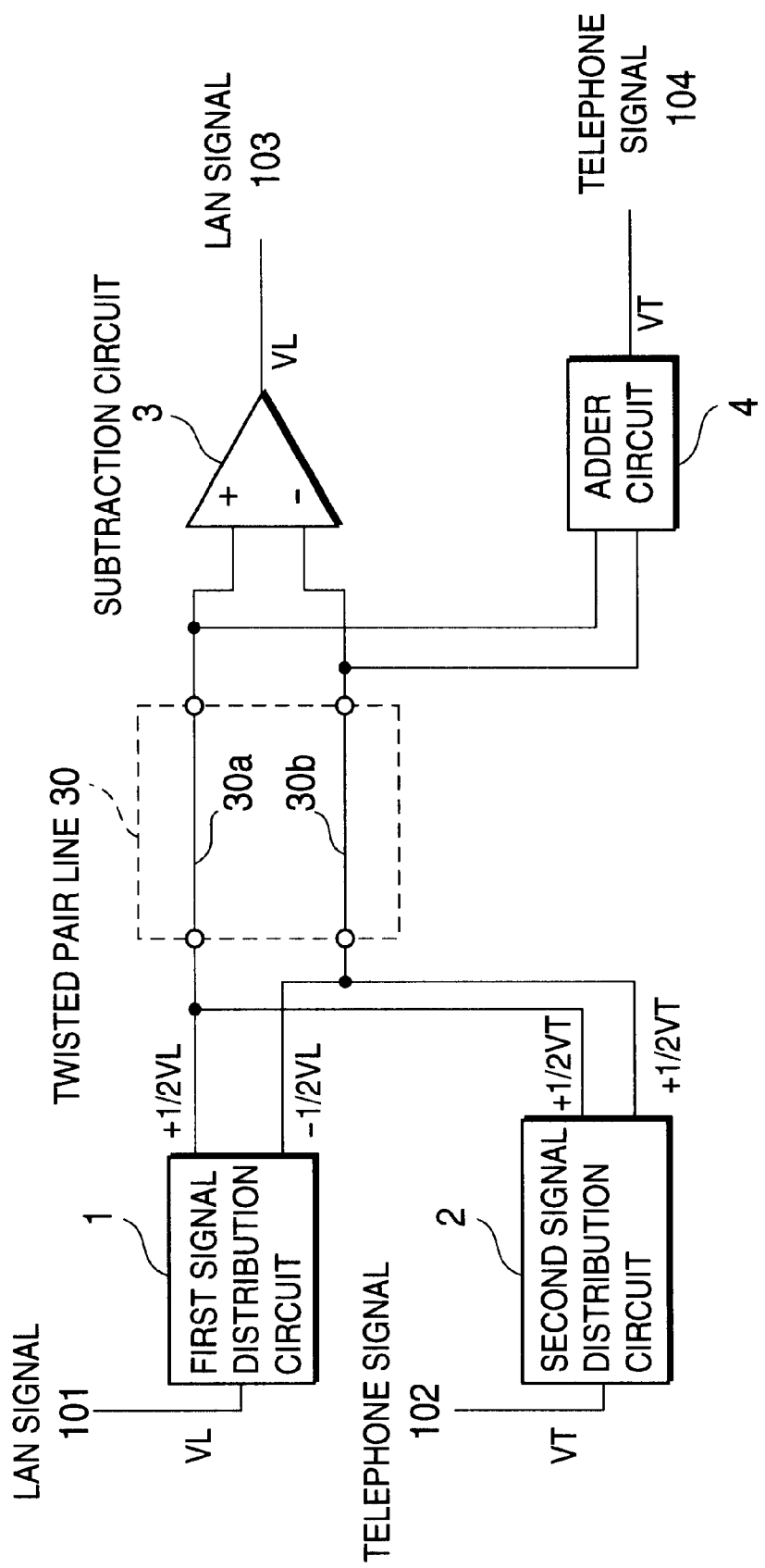
FIG. 5 is a block diagram showing a second embodiment of the integrated transmitter of the present invention.

FIG. 5 is a block diagram showing a second embodiment of the integrated transmitter of the present invention. In the second embodiment of the integrated transmitter, a twisted pair line 30 is used instead of the coaxial cable 10 of FIG. 1. The twisted pair line 30 is a cable of 10BASE-T in conformity with the LAN standards.

The twisted pair line 30 has lines 30a and 30b, the LAN signal having the voltage value ½VL and the telephone signal having the voltage value of ½VT are supplied to the line 30a and transmitted thereon, and the LAN signal having the voltage value of -½VL and the telephone signal having the voltage value of ½VT are supplied to the line 30b and transmitted thereon. Other operations and constitutions are the same as those of the first embodiment.

As described above, the coaxial cable and the twisted pair line in conformity with the LAN standards can be used as the lines between the transmission side and the receiving side, and the LAN signal and the telephone signal can be simultaneously transmitted without using the telephone line.

Figure 6:
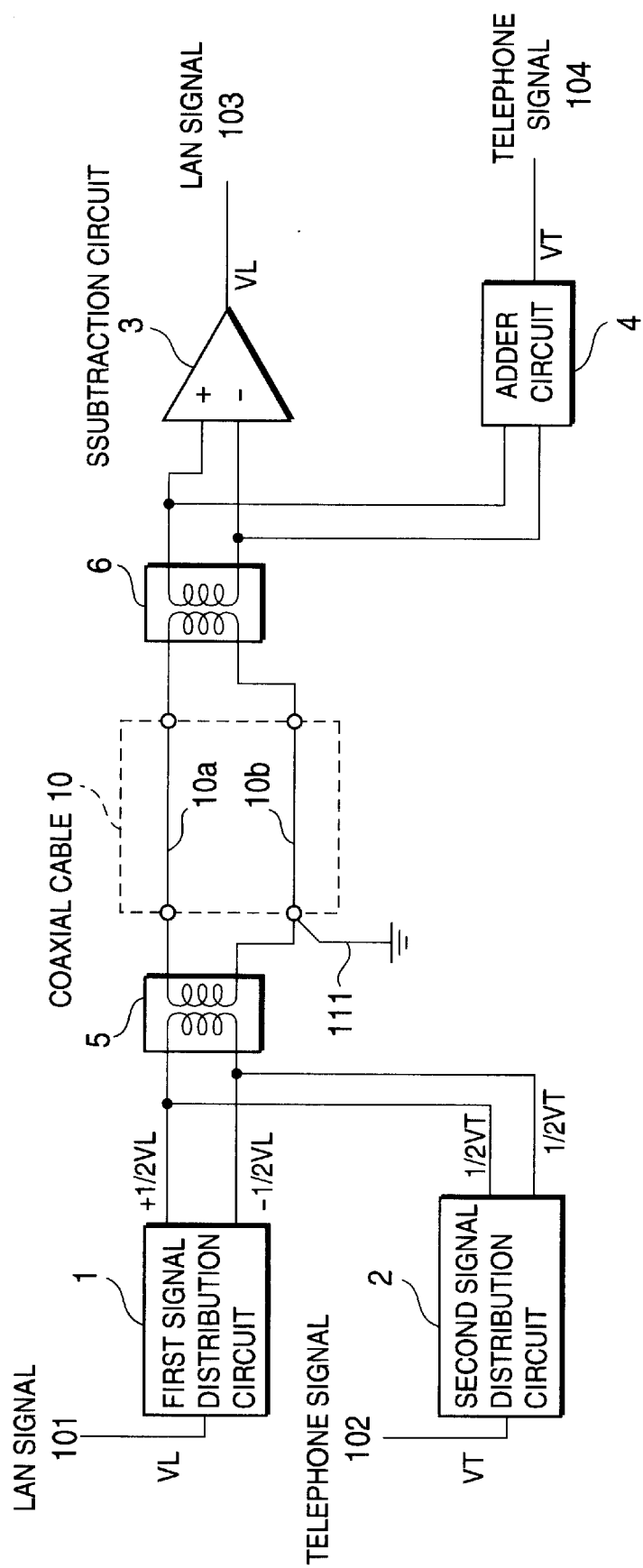
FIG. 6 is a block diagram showing a third embodiment of the integrated transmitter of the present invention.

FIG. 6 is a block diagram showing a third embodiment of the integrated transmitter of the present invention. The third embodiment of the integrated transmitter shown in FIG. 6 differs from the first embodiment in that the outer conductor 10b of the coaxial cable 10 is grounded, and transducers 5 and 6 are connected to the transmission side and the receiving side of the coaxial cable 10. One side of the transducer 5, which is opposite to the coaxial cable 10, is connected to connection nodes of the output terminals of the first and second signal distribution circuits 1 and 2, and one side of the transducer 6, which is opposite to the coaxial cable 10, is connected to connection nodes of the input terminals of the subtraction circuit 3 and the adder circuit 4.

The outer conductor 10b of the coaxial cable 10 is grounded, and thus noise characteristics of the coaxial cable 10 can be improved. Accordingly, outputting of noises from the adder circuit 4 on the receiving side can be prevented.

The transducers 5 and 6 function as an insulating circuit for converting a voltage level by grounding the outer conductor 10b of the coaxial cable 10. In this embodiment, since the LAN signal and the telephone signal are used by converting the voltage value based on the ground side potential (111), the potential conversion is performed by the transducers 5 and 6.

The potential conversion is not performed only by the transducer, but the potential conversion may be performed in such manner that the voltage value is obtained by other electrical computations such as digitizing and then the voltage value is converted thus outputting it to the central conductor of the coaxial cable.

Figure 7:
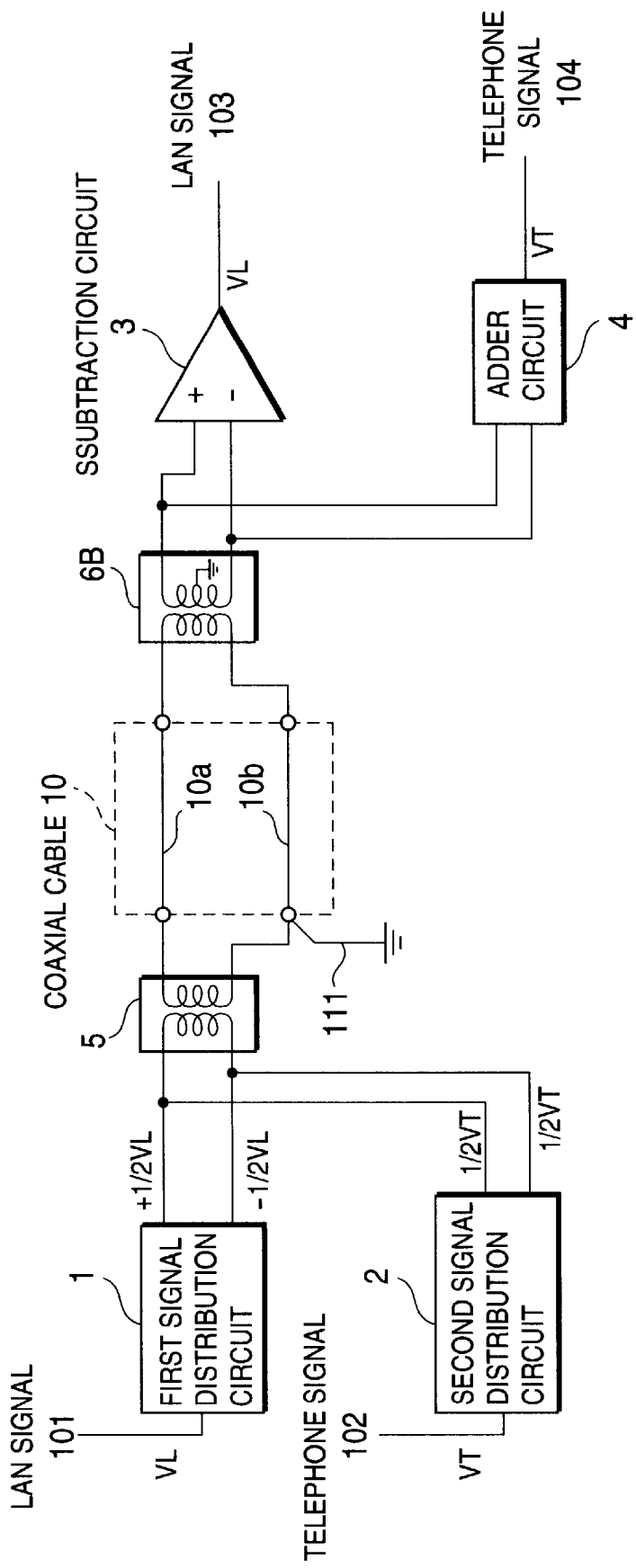
FIG. 7 is a block diagram showing a fourth embodiment of the integrated transmitter of the present invention.

FIG. 7 is a block diagram showing a fourth embodiment of the integrated transmitter of the present invention. The fourth embodiment of the integrated transmitter of FIG. 7 differs from the third embodiment of FIG. 6 in that the transducer 6B on the receiving side has a center tap, the center tap is located on the subtraction circuit side and the adder circuit side, and the center tap is grounded.

In FIG. 7, the transducer having the center tap is used for the transducer 6B in order to stabilize the operations of the subtracting circuit 3 and the adder circuit 4. Thus, a ground potential on the input sides of the subtracting circuit 3 and the adder circuit 4 is made to be clear, thus increasing a transmission precision and a transmission speed.

Since the transducer 6B is grounded only at its center tap and does not transmit a signal between its center taps and does not fetch out the signal unlike the integrated transmitter disclosed in Japanese Patent Laid-Open 8(1996)-331169, a transducer with a center tap on the market is satisfactory, and a transducer with a center tap with a high precision is not necessary.

Figure 8:
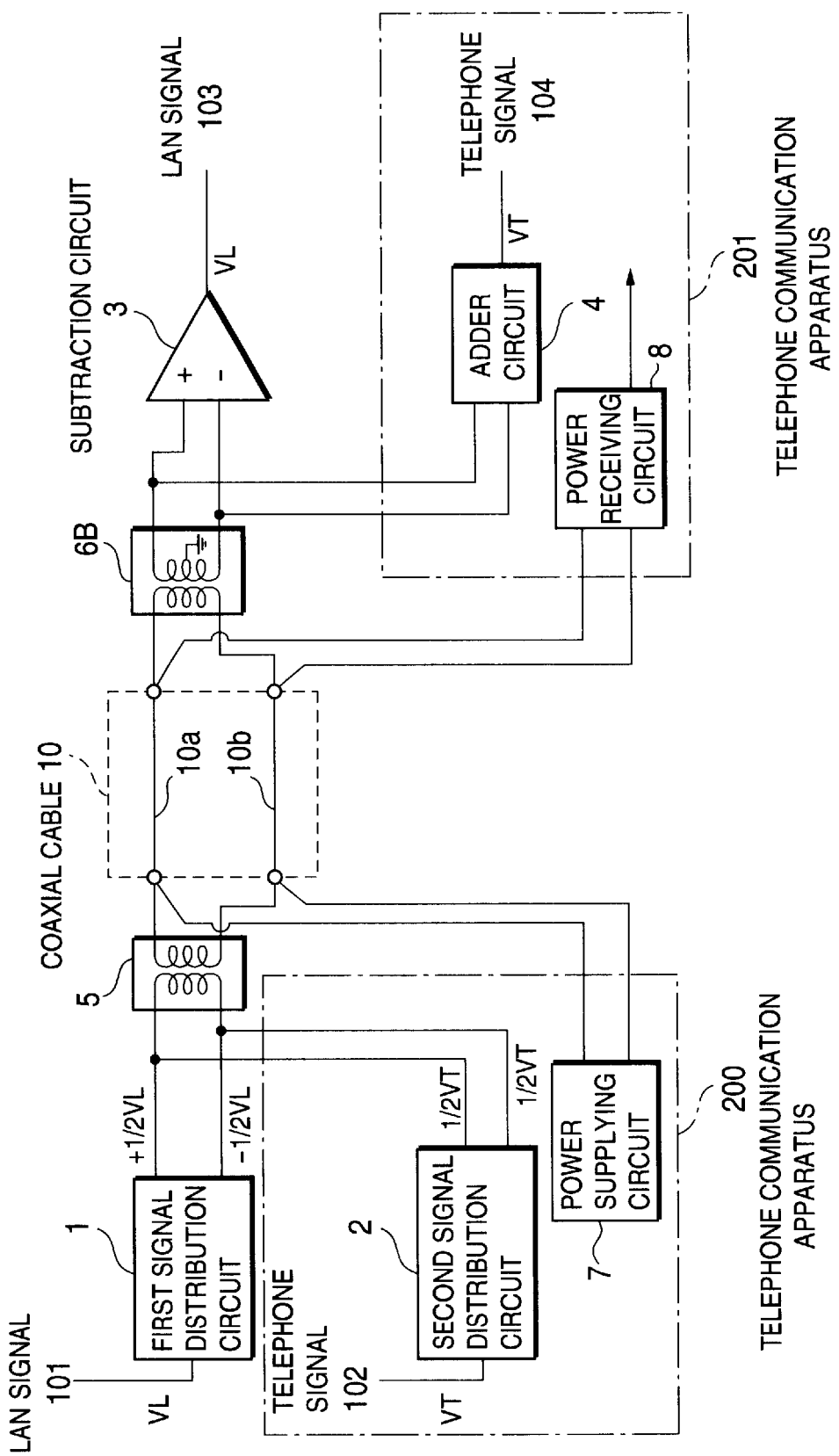
FIG. 8 is a block diagram showing a fifth embodiment of the integrated transmitter of the present invention.

FIG. 8 is a block diagram showing a fifth embodiment of the integrated transmitter of the present invention, and FIG. 8 is a modification of the fourth embodiment shown in FIG. 7.

In FIG. 8, the second signal distribution circuit 2 is disposed within a telephone communication apparatus 200 having a power supplying circuit 7, and the adder circuit 4 is disposed within a telephone communication apparatus 201 having a power receiving circuit 8.

The power supplying circuit 7 supplies a DC voltage to the telephone communication apparatus 201 during a telephone communication if necessity arises. A power supplying signal is transmitted through the coaxial cable 10, and received and detected by the power receiving circuit 8. The detected power supplying signal is used for supplying the power to the telephone communication apparatus 201. Alternatively, the power supplying signal is used for transmitting a false loop detection signal and a polarity inversion signal during the telephone communication.

In the case of the integrated transmitter shown in FIG. 8, the power supplying circuit 7 is connected between the transducer 5 and the coaxial cable 10, and the power receiving circuit 8 is connected between the transducer 6B and the coaxial cable 10 in order that influences on the first and second signal distribution circuits 1 and 2, the subtraction circuit 3 and the adder circuit 4 owing to the power supply are shut off by the transducers 5 and 6B.

Notes that the power supply is not limited to a way by connecting a battery directly to the coaxial cable, but may be other ways such as phantom power supply.

Figure 9:
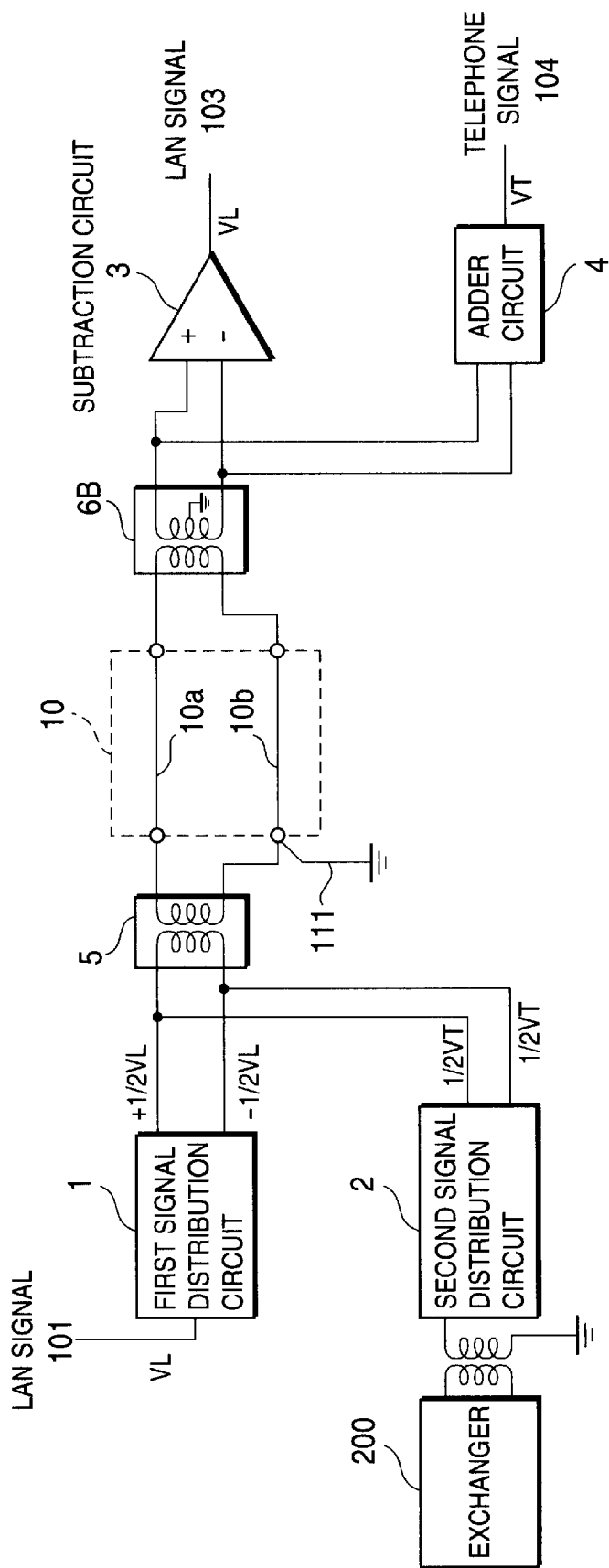
FIG. 9 is a block diagram showing a sixth embodiment of the integrated transmitter of the present invention.

FIG. 9 is a block diagram showing a sixth embodiment of the integrated transmitter of the present invention. FIG. 9 shows a modification of the fourth embodiment shown in FIG. 7.

In this embodiment, an exchanger 200 is connected to an input terminal of the second signal distribution circuit 2 interposing a transducer therebetween. The telephone communication apparatus may be the exchanger.

The embodiments as described above are the examples of one way communications. However, the present invention can be embodied also by both way communications. The both way communications can be realized not only by a ping-pong transmission of LAN, but also can be realized by means of frequency division and time division in the ping-pong transmission system in which telephone communications are performed in U-points of ISDN. Accordingly, also the telephone communication is not limited to the one way communications.

Figure 10:
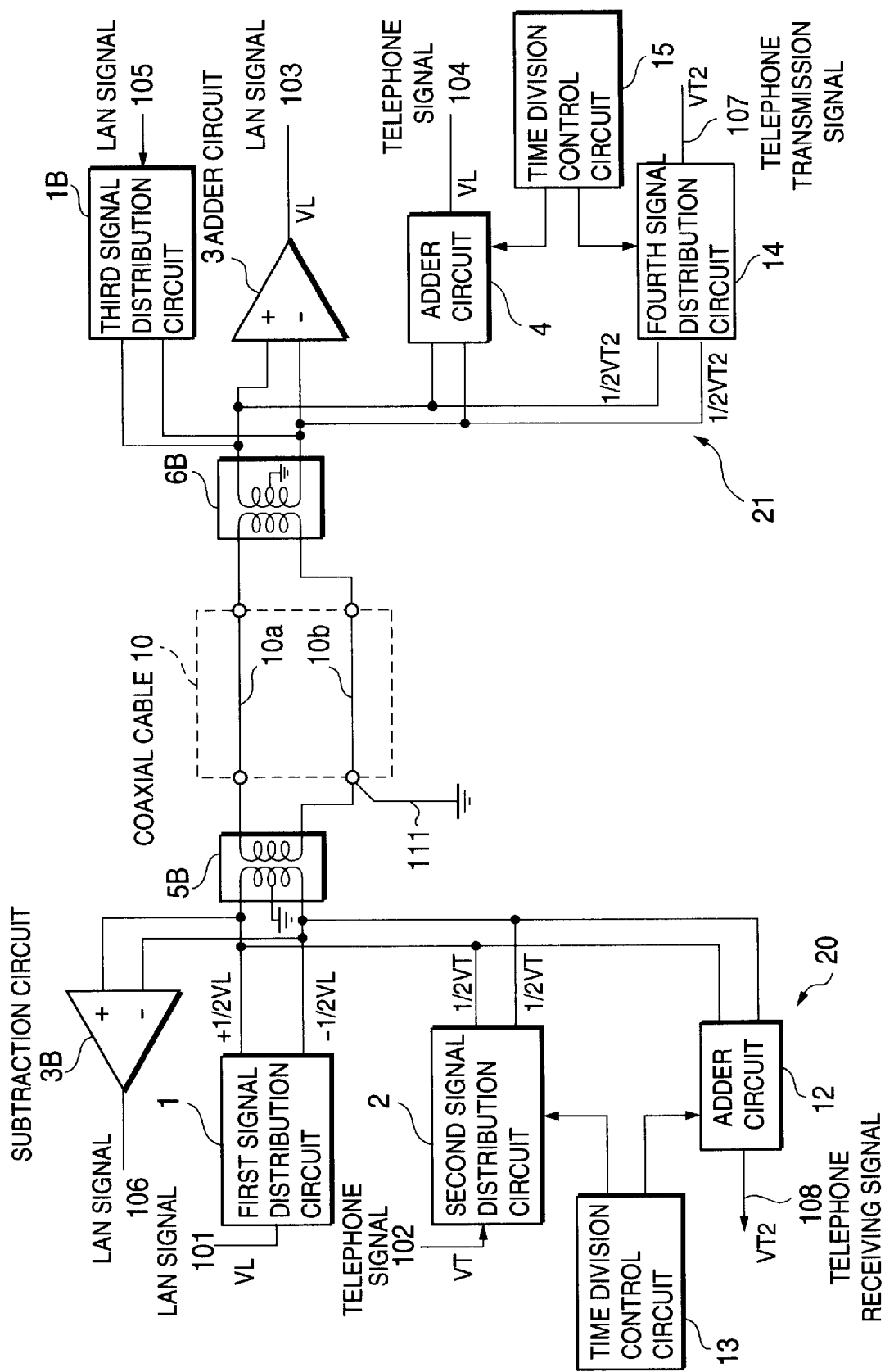
FIG. 10 is a block diagram showing a seventh embodiment of the integrated transmitter of the present invention.

FIG. 10 is a block diagram showing a seventh embodiment of the integrated transmitter of the present invention.

FIG. 7 shows an example for realizing a both way communication for LAN signals and telephone signals.

In FIG. 10, this embodiment differs from the fourth embodiment of FIG. 7 in that a third signal distribution circuit 1B is provided in parallel with the subtraction circuit 3 in order to perform the both way communication of the LAN signal, a subtraction circuit 3B is provided in parallel with the first signal distribution circuit 1, a fourth signal distribution circuit 14, a time division control circuit 15, an adder circuit 12 and a time division control circuit 13 are newly provided in order to perform the both way communication of the telephone signal.

Furthermore, in this embodiment, a transducer 5B is equipped with a center tap similarly to a transducer 6B.

The LAN signal 105 inputted to the third signal distribution circuit 1B, which is shown on the right side of FIG. 10, is generated at a different timing from that of the LAN signal 101 inputted to the first signal distribution circuit 1, and is distributed into inverted and non-inverted signals by the third signal distribution circuit 1B, in the same manner as that the first signal distribution circuit 1. The inverted and non-inverted signals are transmitted through the coaxial cable 10, and then received and detected by the subtraction circuit 3B. Thereafter, they are outputted as the LAN signal 106 from the subtraction circuit 3B.

Thus, the ups and downs of the LAN signal are shared on the coaxial cable, thus realizing the both way LAN communication.

With respect to the telephone communication performed simultaneously with the both way LAN communication, the both way communication is realized by time division communication controls by means of the time division control circuits 13 and 15. To be more specific, the telephone transmission signal 107 having the voltage value of VT2, which is shown on the right side of FIG. 10, is distributed into two non-inverted signals having the voltage value of ½VT2 by the fourth signal distribution circuit 14, in the same manner as that in the second signal distribution circuit 2. The two non-inverted signals are received and detected by the adder circuit 12 through the coaxial cable 10, and then outputted therefrom as the telephone receiving signal 108. On the other hand, the telephone signal 102 having the voltage value of VT, which is shown on the left side of FIG. 10, is distributed into two non-inverted signals having the voltage value of ½VT by the second signal distribution circuit 2 at a timing different from that when the transmission signal 107 is distributed. The two non-inverted signals distributed by the second signal distribution circuit 2 are transmitted through the coaxial cable 10 to be received and detected by the adder circuit 4 to be outputted therefrom as the telephone signal 104.

In the embodiment shown in FIG. 10, the contents communicated by the telephone may be signals between individual line telephones or multiple signals through an exchanger, and are not limited to these.

In the embodiments described above, the LAN communication equipment and the telephone communication apparatus are individual from each other, and they may be integrated with each other. For example, a LAN communication equipment 400 shown in FIG. 11 is an example in which they are integrated with each other, and a telephone apparatus 500 shown in FIG. 12 is also an example of the integration of them.

Figure 11:
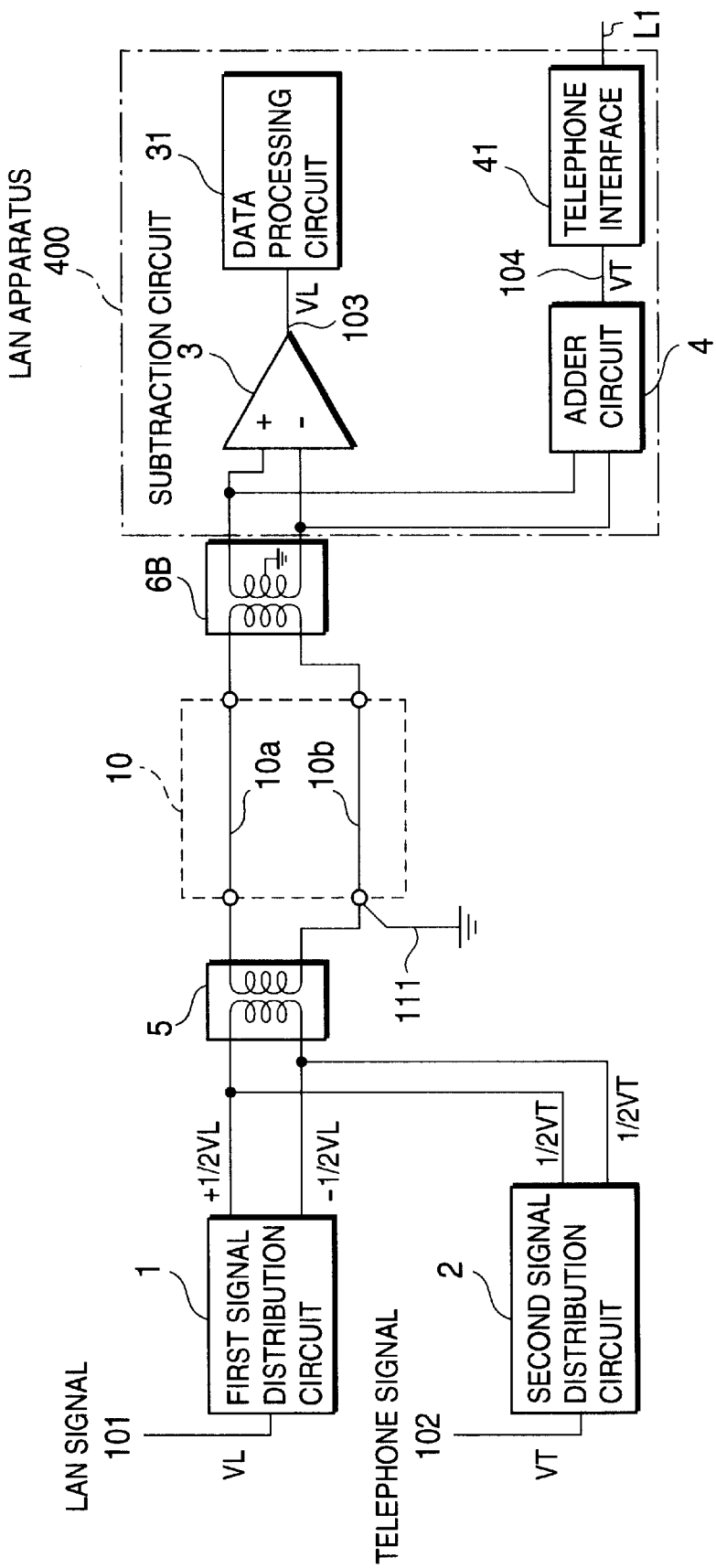
FIG. 11 is a block diagram showing an eighth embodiment of the integrated transmitter of the present invention.
Figure 12:
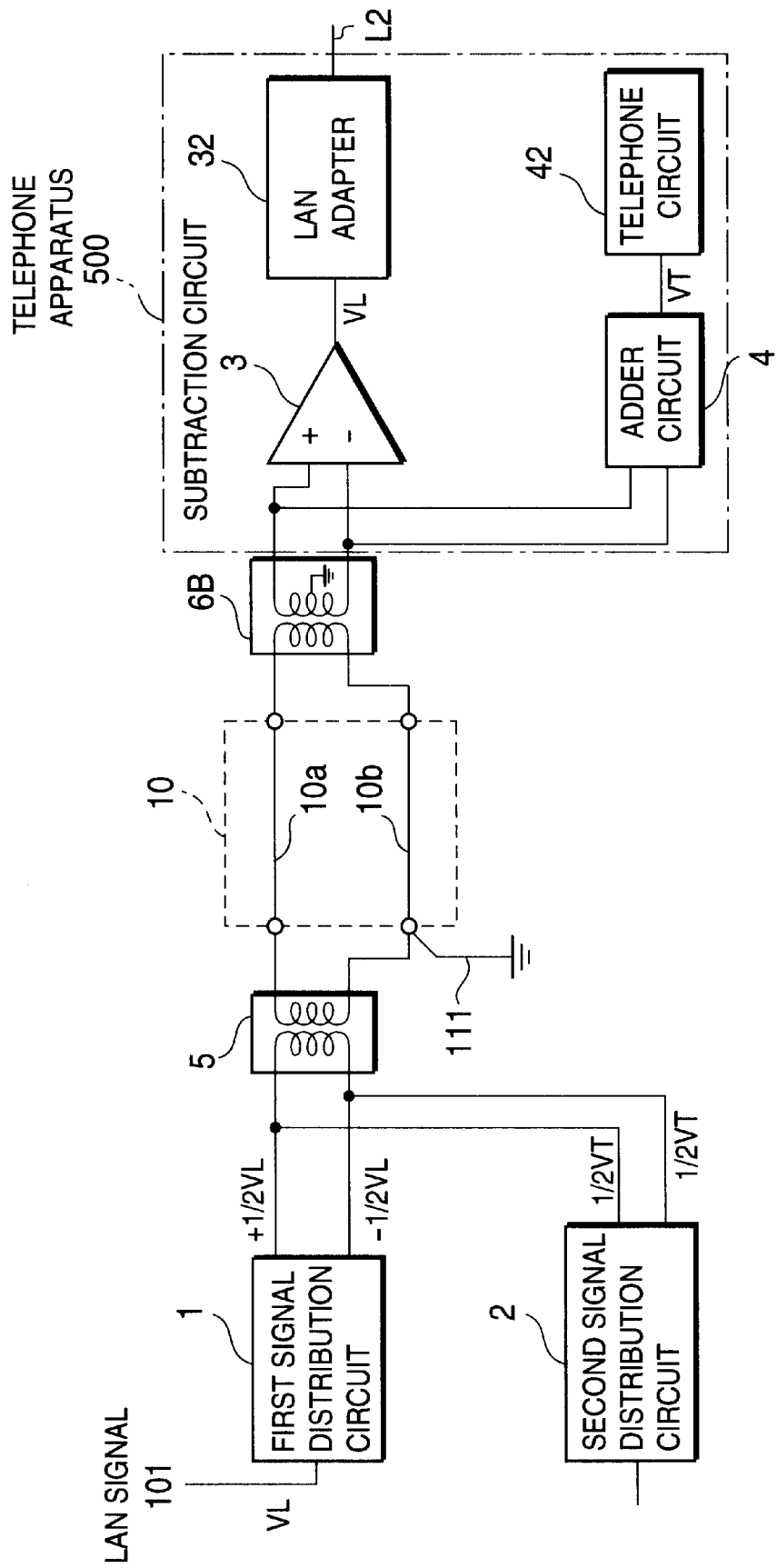
FIG. 12 is a block diagram showing a ninth embodiment of the integrated transmitter of the present invention.

FIG. 11 is a block diagram showing an eighth embodiment of the integrated transmitter of the present invention. FIG. 12 is a block diagram showing a ninth embodiment of the integrated transmitter of the present invention.

In FIG. 11, the LAN apparatus 400 has a data processing circuit 31 and a telephone interface 41 in addition to the subtraction circuit 3 and the adder circuit 4 which are provided in the fourth embodiment shown in FIG. 7. The data processing circuit 31 performs a data processing for the LAN signal 103 detected by the subtraction circuit 3, and the telephone interface 41 sends out the telephone signal 104 detected by the adder circuit 4 onto the telephone line L1.

In other words, the LAN apparatus 400 shown in FIG. 11 is a LAN communication equipment connected to an integrated transmitter having a transmission circuit which distributes the LAN signal into first and second signals having an equal absolute value, distributes the telephone signal into third and fourth signals having an equal absolute value, and sends out the first and third signals, and the second and fourth signals individually onto two lines of a transmission line, that is, the coaxial cable 10. The LAN communication equipment 400 includes a receiving circuit for adding or subtracting the signals individually transmitted on the two lines of the transmission line to detect either the LAN signal or the telephone signal, the data processing circuit 31 for receiving the LAN signal detected by the receiving circuit and for performing the data processing for the detected LAN signal, and an interface (telephone interface 41) for supplying the telephone signal detected by the receiving circuit to the outside.

The data processing performed by the data processing circuit 31 may include any of a computation, a displaying and a data transfer. Moreover, the data processing may include processings for connecting the LAN communication equipment 400 to other networks.

The telephone interface 41 includes a level conversion circuit and a connector, which are connected to the telephone set.

In this embodiment, a telephone circuit is satisfactory instead of the telephone interface 41, and the LAN apparatus 400 may be united with a telephone set.

In FIG. 12, the telephone apparatus 500 has a LAN adapter 32 for connecting the LAN signal 103 detected by the subtracting circuit 3 to a LAN data terminal, and a telephone circuit 42 for performing a telephone communication by the telephone signal 104 detected by the adder circuit 4, in addition to the subtraction circuit 3 and the adder circuit 4 which are provided in the fourth embodiment shown in FIG. 7.

In other words, the telephone apparatus 500 shown in FIG. 12 is a telephone apparatus connected to an integrated transmitter having a transmission circuit which distributes the LAN signal into first and second signals having an equal absolute value, distributes the telephone signal into third and fourth signals having an equal absolute value, and sends out the first and third signals, and the second and fourth signals individually onto two lines of a transmission line. The telephone apparatus 500 includes a receiving circuit for adding or subtracting the signals individually transmitted on the two lines of the transmission line to detect either the LAN signal or the telephone signal, a telephone circuit 42 for receiving the telephone signal detected by the receiving circuit to execute a telephone communication and an interface (LAN adapter 32) for supplying the LAN signal detected by the receiving circuit to the outside.

In the eighth and ninth embodiments of the integrated transmitter shown in FIGS. 11 and 12, although only the one way LAN communication and the one way telephone communication are performed, the present invention can be applied to the both way LAN communication and the both way telephone communication as shown in FIG. 10.

Figure 13:
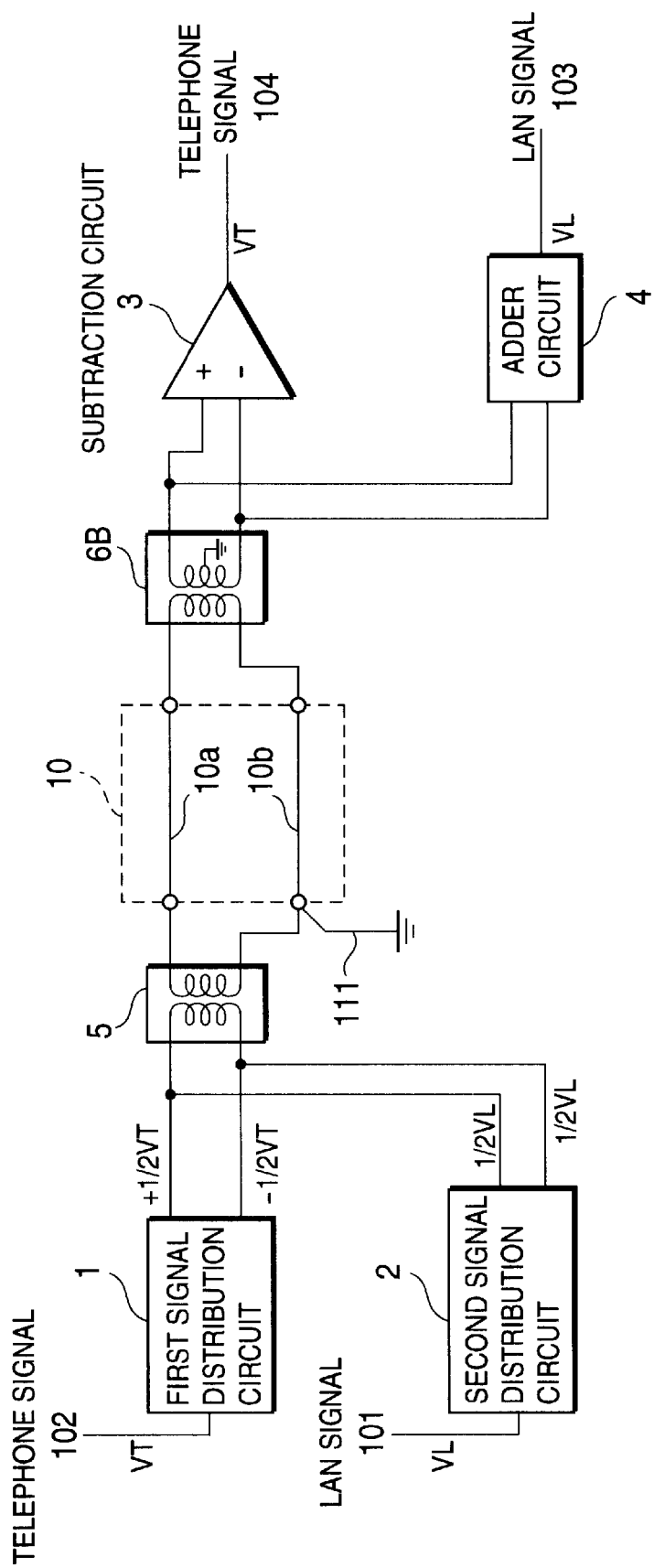
FIG. 13 is a block diagram showing a tenth embodiment of the integrated transmitter of the present invention.

According to the eighth and ninth embodiments of the integrated transmitter shown in FIGS. 11 and 12, a LAN communication equipment and a telephone communication apparatus adopting new structures in which the telephone communication and the LAN communication are integrated with each other can be provided. Particularly, in the case of the telephone apparatus 500 shown in FIG. 12, a new structure which the telephone apparatus 500 can be connected to the LAN channel is realized, In the embodiments described above, the LAN signal is inputted to the first signal distribution circuit and the telephone signal is inputted to the second signal distribution circuit, and, as a matter of course, the LAN signal may be inputted to the second signal distribution circuit and the telephone signal may be inputted to the first signal distribution circuit. For example, as shown in FIG. 13 which illustrates a tenth embodiment of the present invention, the telephone signal 102 may be supplied to the first signal distribution circuit 1, and the LAN signal 101 may be supplied to the second signal distribution circuit 1. In this case, the telephone signal 104 having the voltage value of VT is obtained from the subtraction circuit 3, and the LAN signal 103 having the voltage value of VL is obtained from the adder circuit 4.

Moreover, the telephone communication apparatus is not limited to a digital telephone terminal, but the telephone communication apparatus may be a telephone communication system such as a line exchanger and a packet exchanger and is not limited to a specified structure.

As described above, a first effect of the present invention is as follows. Specifically, since the LAN and the telephone are integrated with each other without supplying the telephone signal to the center tap of the transducer, that is, without constituting the transducer superposing/separating circuit and the telephone signal can be superposed on the LAN signal, a high speed operation can be achieved and the telephone line can be made to be unnecessary.

A second effect of the present invention is as follows. Since the line of the LAN that has been already constructed can be used and the inexpensive transducer on the market, which requires no precision of its center tap, can be used, the integrated transmitter shows an economical efficiency.

A third effect of the present invention is as follows. The telephone communication apparatus and the LAN communication equipment, which are connected either to the coaxial cable or to the twisted pair line of the LAN and capable of integrally transmitting the telephone signal and the LAN data, can be provided.

A fourth effect of the present invention is as follows. Communication speeds of the LAN signal and the telephone signal are not interfered with each other, and voice attenuation and delay due to data collision in a LAN system can be neglected.

A fifth effect of the present invention is as follows. Although voice over IP (VOIP), which is an Internet protocol, receives many attentions, the line of the present LAN system can be used satisfactorily on the premises, and since the LAN communication and the telephone communication do not interfere with each other, a reconstruction considering a traffic is unnecessary.

A sixth effect of the present invention is as follows. When the LAN signal and the telephone signal are transmitted in the form of the VOIP to the outside (Internet), information relating to both the LAN and the telephone can be interfaced with the VOIP device only by the line of the LAN, and the integrated transmitter of the present invention can be operated without allowing problems of the VOIP such as delay, data attenuation, deterioration of voice quality due to compression and a relay time jitter on the Internet to affect the premise.

Although the preferred embodiments of the present invention have been described in detail, it should be understood that various changes, substitutions and alternations can be made therein without departing from spirit and scope of the inventions as defined by the appended claims.

What is claimed is:

1. An integrated transmitter comprising:
   a first signal distribution circuit for distributing a LAN signal into first and second signals, each of which has an absolute value equal to each other;
   a second signal distribution circuit for distributing a telephone signal into third and fourth signals, each of which has an absolute value equal to each other;
   a transmission line having two lines which transmit individually said first and third signals and said second and fourth signals; and
   a receiving circuit for detecting at least one of said LAN signal and said telephone signal by adding one of the signals to the other signal, transmitted on each of the two lines of said transmission line, or subtracting one of the signals from the other signal, transmitted on each of the two lines of said transmission line.

2. The integrated transmitter according to claim 1, wherein said first signal distribution circuit distributes said LAN signal into two signals and outputs the two signals as said first and second signals, the first signal being non-inverted and the second signal being inverted, each of which has an equal absolute value to each other, and said second signal distribution circuit distributes said telephone signal into two signals and outputs the two signals as said third and fourth signals, each of which has an equal absolute value to each other and a same sign to each other.

3. The integrated transmitter according to claim 1, wherein said first signal distribution circuit distributes said LAN signal into two signals and outputs the two signals as said first and second signals, each of which has an equal absolute value to each other and the same sign, and said second signal distribution circuit distributes said telephone signal into two signals and outputs the two signals as said third and fourth signals, the third signal being non-inverted and the fourth signal being inverted, each of which has an equal absolute value to each other.

4. The integrated transmitter according to claim 2, wherein said receiving circuit subtracts said second and fourth signals from said first and third signals to detect said LAN signal, the first and third signals being transmitted on one of said two lines and the second and fourth signals being transmitted on the other line.

5. The integrated transmitter according to any one of claims 2 or 4) wherein said receiving circuit adds said second and fourth signals to said first and third signals to detect said telephone signal, the first and third signals being transmitted on one of said two lines and the second and fourth signals being transmitted on the other line.

6. The integrated transmitter according to claim 3, wherein said receiving circuit adds said second and fourth signals to said first and third signals to detect said LAN signal, the first and third signals being transmitted on one of said two lines and the second and fourth signals being transmitted on the other line.

7. The integrated transmitter according to any one of claims 3 or 6, wherein said receiving circuit subtracts said second and fourth signals from said first and third signals to detect said telephone signal, the first and third signals being transmitted on one of said two lines and the second and fourth signals being transmitted on the other line.

8. An integrated transmitter comprising:

a transmission circuit for distributing a LAN signal into first and second signals, each of which has an absolute value equal to each other, for distributing a telephone signal into third and fourth signals, each of which has an absolute value equal to each other, and for sending out individually said first and third signals and said second and fourth signals onto two lines of a transmission line; and a receiving circuit for detecting at least one of said LAN signal and said telephone signal by adding one of the signals to the other signal, transmitted on each of the two lines of said transmission line, or subtracting one of the signals from the other signal, transmitted on each of the two lines of said transmission line.

9. The integrated transmitter according to any one of claims 1 or 8, wherein said transmission line is a transmission in compliance with LAN standards.

10. The integrated transmitter according to any one of claims 1 or 8, wherein said transmission line is a coaxial cable, and said two lines are a center conductor and an outer conductor of the coaxial cable, respectively.

11. The integrated transmitter according to claim any one of claims 1 or 8, wherein said transmission line is a twisted pair line, and said two lines are two conductive lines of the twisted pair line.

12. The integrated transmitter according to claim 10, wherein said outer conductor of said coaxial cable is grounded, one end of said coaxial cable is isolated from the first and second signal distribution circuits by a transducer, and the other end of said coaxial cable is isolated from the receiving circuit by a transducer.

13. The integrated transmitter according to claim 12, wherein a center tap of the transducer located on the receiving circuit side among the transducers on both sides of said coaxial cable is grounded relative to the receiving circuit.

14. The integrated transmitter according to any one of claims 1 or 8, the apparatus further comprising:

a power supplying circuit connected to said transmission line; and a power receiving circuit for receiving a power supplying signal transmitted from said transmission line.

15. A LAN communication equipment which is connected to an integrated transmitter having a transmission circuit for distributing a LAN signal into first and second signals, each of which has an absolute value equal to each other, for distributing a telephone signal into third and fourth signals, each of which has an absolute value equal to each other, and for sending out individually said first and third signals and said second and fourth signals onto two lines of a transmission line, comprising:

a receiving circuit for detecting said LAN signal and said telephone signal by adding one of the signals to the other signal, transmitted on each of the two lines of said transmission line, or subtracting one of the signals from the other signal, transmitted on each of the two lines of said transmission line;

a processing circuit for receiving the LAN signal detected by said receiving circuit to execute a data processing for the LAN signal; and an interface for supplying the telephone signal detected by said receiving circuit to the outside.

16. A LAN communication equipment which is connected to an integrated transmitter having a transmission circuit for distributing a LAN signal into first and second signals, each of which has an absolute value equal to each other, for distributing a telephone signal into third and fourth signals, each of which has an absolute value equal to each other, and for sending out individually said first and third signals and said second and fourth signals onto two lines of a transmission line, comprising:

a receiving circuit for detecting said LAN signal and said telephone signal by adding one of the signals to the other signal, transmitted on each of the two lines of said transmission line, or subtracting one of the signals from the other signal, transmitted on each of the two lines of said transmission line;

a processing circuit for receiving the LAN signal detected by said receiving circuit to execute a data processing for the LAN signal; and a telephone circuit for executing a telephone communication by the telephone signal detected by said receiving circuit.

17. A telephone communication equipment which is connected to an integrated transmitter having a transmission circuit for distributing a LAN signal into first and second signals, each of which has an absolute value equal to each other, for distributing a telephone signal into third and fourth signals, each of which has an absolute value equal to each other, and for sending out individually said first and third signals and said second and fourth signals onto two lines of a transmission line, comprising:

a receiving circuit for detecting said LAN signal and said telephone signal by adding one of the signals to the other signal, transmitted on each of the two lines of said transmission line, or subtracting one of the signals from the other signal, transmitted on each of the two lines of said transmission line;

a telephone circuit for executing a telephone communication by the telephone signal detected by said receiving circuit; and an interface for supplying the LAN signal detected by said receiving circuit to the outside.

18. A communication method of a telephone signal and a LAN signal, comprising the steps of:

distributing a LAN signal into first and second signals, each of which has an absolute value equal to each other;

distributing a telephone signal into third and fourth signals, each of which has an absolute value equal to each other;

sending out individually said first and third signals onto one of two lines of a transmission line and said second and fourth signals onto the other of the two lines of the transmission line; and detecting at least one of said LAN signal and said telephone signal by adding one of the signals to the other signal, or subtracting one of the signals from the other signal.

* * * * *